(12) United States Patent
Kotrba et al.

(10) Patent No.: US 8,353,153 B2
(45) Date of Patent: Jan. 15, 2013

(54) SNAPPER VALVE FOR HOT END SYSTEMS WITH BURNERS

(75) Inventors: Adam Kotrba, Lainsburg, MI (US); Guanyu Zheng, Novi, MI (US); Mike Golin, Dexter, MI (US); Gabriel Salanta, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 310 days.

(21) Appl. No.: 12/712,395

(22) Filed: Feb. 25, 2010

(65) Prior Publication Data

US 2011/0203261 A1    Aug. 25, 2011

(51) Int. Cl.
*F01N 3/22* (2006.01)

(52) U.S. Cl. ........... 60/300; 60/286; 60/287; 60/289; 60/297; 60/301; 60/303; 60/311; 60/324

(58) Field of Classification Search ............ 60/286, 60/287, 288, 289, 297, 301, 303, 311, 324
See application file for complete search history.

(56) References Cited

U.S. PATENT DOCUMENTS

| | | |
|---|---|---|
| 1,613,332 A | 1/1927 | Goetz |
| 1,709,426 A | 4/1929 | Beery |
| 1,832,090 A | 11/1931 | Branche |
| 1,840,082 A | 1/1932 | Breer |
| 1,860,892 A | 5/1932 | Gray |
| 2,072,372 A | 3/1937 | Kingsley |
| 2,157,030 A | 5/1939 | Starkweather |
| 2,268,806 A | 1/1942 | Curtis |
| 2,380,374 A | 7/1945 | Anderson |
| 2,556,277 A | 6/1951 | Hill et al. |
| 2,855,283 A | 10/1958 | Schumacher |
| 2,986,373 A | 5/1961 | Masheder |
| 3,020,980 A | 2/1962 | Baker et al. |
| 3,406,783 A | 10/1968 | Haffer |
| 3,625,249 A | 12/1971 | Karr |
| 3,703,937 A | 11/1972 | Tenney |
| 3,779,015 A * | 12/1973 | Maruoka .......... 60/286 |
| 4,012,904 A * | 3/1977 | Nogle .......... 60/39.511 |
| 4,264,344 A | 4/1981 | Ludecke et al. |
| 4,356,801 A | 11/1982 | Graham |
| 4,396,034 A | 8/1983 | Cherniak |
| 4,541,506 A | 9/1985 | Venning et al. |
| 4,557,108 A * | 12/1985 | Torimoto .......... 60/286 |
| 4,563,605 A | 1/1986 | Gerber |
| 4,565,176 A | 1/1986 | Alf et al. |

(Continued)

FOREIGN PATENT DOCUMENTS

EP     1045180     10/2000

(Continued)

*Primary Examiner* — Thomas Denion
*Assistant Examiner* — Jorge Leon, Jr.
(74) *Attorney, Agent, or Firm* — Harness, Dickey & Pierce, P.L.C.

(57) ABSTRACT

A system for controlling the temperature of an exhaust stream includes a main exhaust passageway adapted to receive the exhaust stream from an engine. A bypass passage includes an inlet and an outlet in communication with the main exhaust passageway. The outlet is located downstream from the inlet. A burner is positioned within the bypass passage for treating the exhaust passing through the bypass passage. A valve is positioned within the main exhaust passageway downstream from the inlet and upstream from the outlet. The valve is operable to vary the exhaust flow through the burner. A controller selectively operates the burner to maintain a desired exhaust temperature downstream of the outlet.

11 Claims, 2 Drawing Sheets

U.S. PATENT DOCUMENTS

| | | | |
|---|---|---|---|
| 4,589,254 A * | 5/1986 | Kume et al. | 60/286 |
| 4,677,823 A * | 7/1987 | Hardy | 60/274 |
| 4,707,987 A | 11/1987 | Atkin | |
| 4,741,156 A * | 5/1988 | Buchner | 60/303 |
| 4,805,571 A | 2/1989 | Humphrey | |
| 4,825,983 A | 5/1989 | Nakanishi | |
| 4,903,486 A | 2/1990 | Finkle | |
| 5,044,396 A | 9/1991 | Daudet et al. | |
| 5,130,099 A | 7/1992 | Schatz | |
| 5,355,673 A | 10/1994 | Sterling et al. | |
| 5,392,812 A | 2/1995 | Herron | |
| 5,581,056 A | 12/1996 | Bellgardt et al. | |
| 5,617,720 A * | 4/1997 | Achleitner et al. | 60/274 |
| 5,633,482 A | 5/1997 | Erion et al. | |
| 5,692,374 A | 12/1997 | Seki et al. | |
| 5,723,829 A | 3/1998 | Inomata et al. | |
| 5,739,483 A | 4/1998 | Yashiro et al. | |
| 5,744,762 A | 4/1998 | Seki et al. | |
| 5,749,335 A | 5/1998 | Flanery et al. | |
| 5,801,343 A | 9/1998 | Suzuki et al. | |
| 5,802,844 A * | 9/1998 | Lee et al. | 60/274 |
| 5,821,474 A | 10/1998 | Olszok et al. | |
| 5,971,098 A | 10/1999 | Suzuki et al. | |
| 6,155,042 A | 12/2000 | Perset et al. | |
| 6,189,650 B1 | 2/2001 | Inuzuka et al. | |
| 6,193,214 B1 | 2/2001 | Schatz | |
| 6,332,442 B1 | 12/2001 | Komada et al. | |
| 6,499,562 B1 | 12/2002 | Elfinger et al. | |
| 6,527,006 B2 | 3/2003 | Jackson | |
| 6,553,963 B1 | 4/2003 | Noble | |
| 6,564,902 B1 | 5/2003 | Saberi | |
| 6,581,721 B2 | 6/2003 | Nagai et al. | |
| 6,598,390 B2 | 7/2003 | Chang | |
| 6,604,516 B1 | 8/2003 | Krimmer et al. | |
| 6,640,927 B1 | 11/2003 | Turner | |
| 6,732,511 B2 | 5/2004 | Unbehaun et al. | |
| 7,201,142 B2 | 4/2007 | Peffley et al. | |
| 7,370,474 B2 * | 5/2008 | Minami | 60/295 |
| 7,434,570 B2 | 10/2008 | Hill | |
| 2004/0178015 A1 | 9/2004 | Wiemeler et al. | |
| 2006/0272322 A1 | 12/2006 | Abram et al. | |
| 2007/0000239 A1 * | 1/2007 | Liu et al. | 60/286 |
| 2007/0220867 A1 * | 9/2007 | Clerc et al. | 60/288 |
| 2008/0202105 A1 * | 8/2008 | Winter et al. | 60/295 |
| 2008/0223025 A1 | 9/2008 | Hill | |
| 2008/0224083 A1 | 9/2008 | Hill | |
| 2008/0245063 A1 * | 10/2008 | Hill | 60/324 |
| 2009/0025371 A1 * | 1/2009 | Hermansson et al. | 60/286 |
| 2009/0223209 A1 | 9/2009 | Kleinfeld | |
| 2010/0100300 A1 * | 4/2010 | Brooks et al. | 701/102 |

FOREIGN PATENT DOCUMENTS

| | | |
|---|---|---|
| JP | 59-20513 | 2/1984 |
| JP | 1997-303143 A | 11/1997 |
| JP | 1998-141041 A | 5/1998 |
| JP | 2000-002112 | 1/2000 |
| JP | 2002-235536 | 8/2002 |
| JP | 2006-322441 | 11/2006 |
| KR | 10-1998-0002656 | 3/1998 |
| KR | 10-1998-0009780 A | 4/1998 |
| KR | 10-2001-0038902 A | 5/2001 |
| WO | WO2008-115212 | 9/2008 |

* cited by examiner

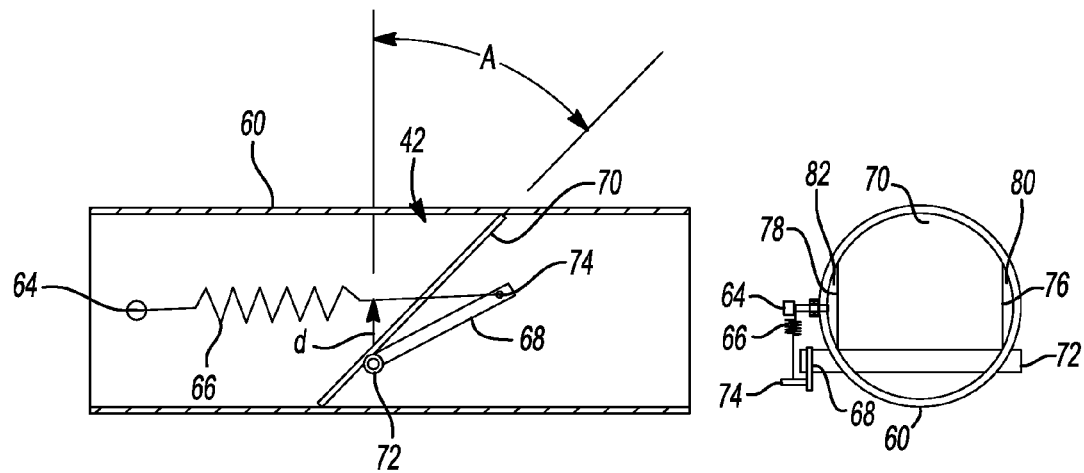
*Fig-2*  *Fig-3*
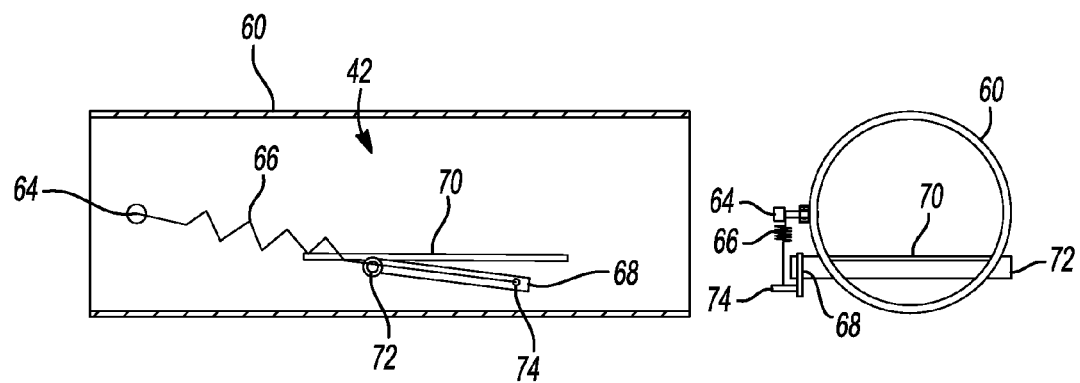
*Fig-4*  *Fig-5*

SNAPPER VALVE FOR HOT END SYSTEMS WITH BURNERS

FIELD

The present disclosure generally relates to a system for treating exhaust gases. More particularly, a flow diverter and burner arrangement for increasing an exhaust gas temperature is discussed.

BACKGROUND

In an attempt to reduce the quantity of $NO_X$ and particulate matter emitted to the atmosphere during internal combustion engine operation, a number of exhaust aftertreatment devices have been developed. A need for exhaust aftertreatment systems particularly arises when diesel combustion processes are implemented. Typical aftertreatment systems for diesel engine exhaust may include one or more of a diesel particulate filter (DPF), a selective catalytic reduction (SCR) system, a hydrocarbon (HC) injector, and a diesel oxidation catalyst (DOC).

During engine operation, the DPF traps soot emitted by the engine and reduces the emission of particulate matter (PM). Over time, the DPF becomes loaded and begins to clog. Periodically generation or oxidation of the trapped soot in the DPF is required for proper operation. To regenerate the DPF, relatively high exhaust temperatures in combination with an ample amount of oxygen in the exhaust stream are needed to oxidize the soot trapped in the filter.

The DOC is typically used to generate heat to regenerate the soot loaded DPF. When hydrocarbons (HC) are sprayed over the DOC at or above a specific light-off temperature, the HC will oxidize. This reaction is highly exothermic and the exhaust gases are heated during light-off. The heated exhaust gases are used to regenerate the DPF.

Under many engine operating conditions, however, the exhaust gas is not hot enough to achieve a DOC light-off temperature of approximately 300° C. As such, DPF regeneration does not passively occur. Furthermore, $NO_X$-adsorbers and selective catalytic reduction systems typically require a minimum exhaust temperature to properly operate.

A burner may be provided to heat the exhaust stream upstream of the various aftertreatment devices. Known burners have successfully increased the exhaust temperature of relatively small displacement internal combustion engines for automotive use. However, other applications including diesel locomotives, stationary power plants, marine vessels and others may be equipped with relatively large diesel compression engines. The exhaust mass flow rate from the larger engines may be more than ten times the maximum flow rate typically provided to the burner. While it may be possible to increase the size of the burner to account for the increased exhaust mass flow rate, the cost, weight and packaging concerns associated with this solution may be unacceptable. Therefore, a need may exist in the art for an arrangement to increase the temperature of the exhaust output from a large diesel engine while minimally affecting the cost, weight, size and performance of the exhaust system. It may also be desirable to minimally affect the pressure drop and/or back pressure associated with the use of a burner.

SUMMARY

This section provides a general summary of the disclosure, and is not a comprehensive disclosure of its full scope or all of its features.

A system for controlling the temperature of an exhaust stream includes a main exhaust passageway adapted to receive the exhaust stream from an engine. A bypass passage includes an inlet and an outlet in communication with the main exhaust passageway. The outlet is located downstream from the inlet. A burner is positioned within the bypass passage for treating the exhaust passing through the bypass passage. A valve is positioned within the main exhaust passageway downstream from the inlet and upstream from the outlet. The valve is operable to vary the exhaust flow through the burner. A controller selectively operates the burner to maintain a desired exhaust temperature downstream of the outlet.

A system for controlling the temperature of an exhaust from an engine includes a bypass passage having an inlet in communication with a main exhaust passageway in receipt of an exhaust stream from the engine. The bypass passage also includes an outlet in communication with the main exhaust passageway at a location downstream from the inlet. A burner is positioned within the bypass passage for heating the exhaust passing through the bypass passage. A valve is positioned within the main exhaust passageway downstream from the inlet and upstream from the outlet. The valve is operable to vary the exhaust flow through the burner. An exhaust aftertreatment device is located downstream of the outlet in receipt of a mixed exhaust supplied from the bypass passage and the main exhaust passageway.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a side view of a valve from the temperature control system in a closed position;

FIG. 3 is an end view of the valve of FIG. 2 in the closed position;

FIG. 4 is side view of the valve of FIG. 2 in a fully open position; and

FIG. 5 is an end view of the valve of FIG. 2 shown in a fully open position.

Corresponding reference numerals indicate corresponding parts throughout the several views of the drawings.

DETAILED DESCRIPTION

Figure 1:
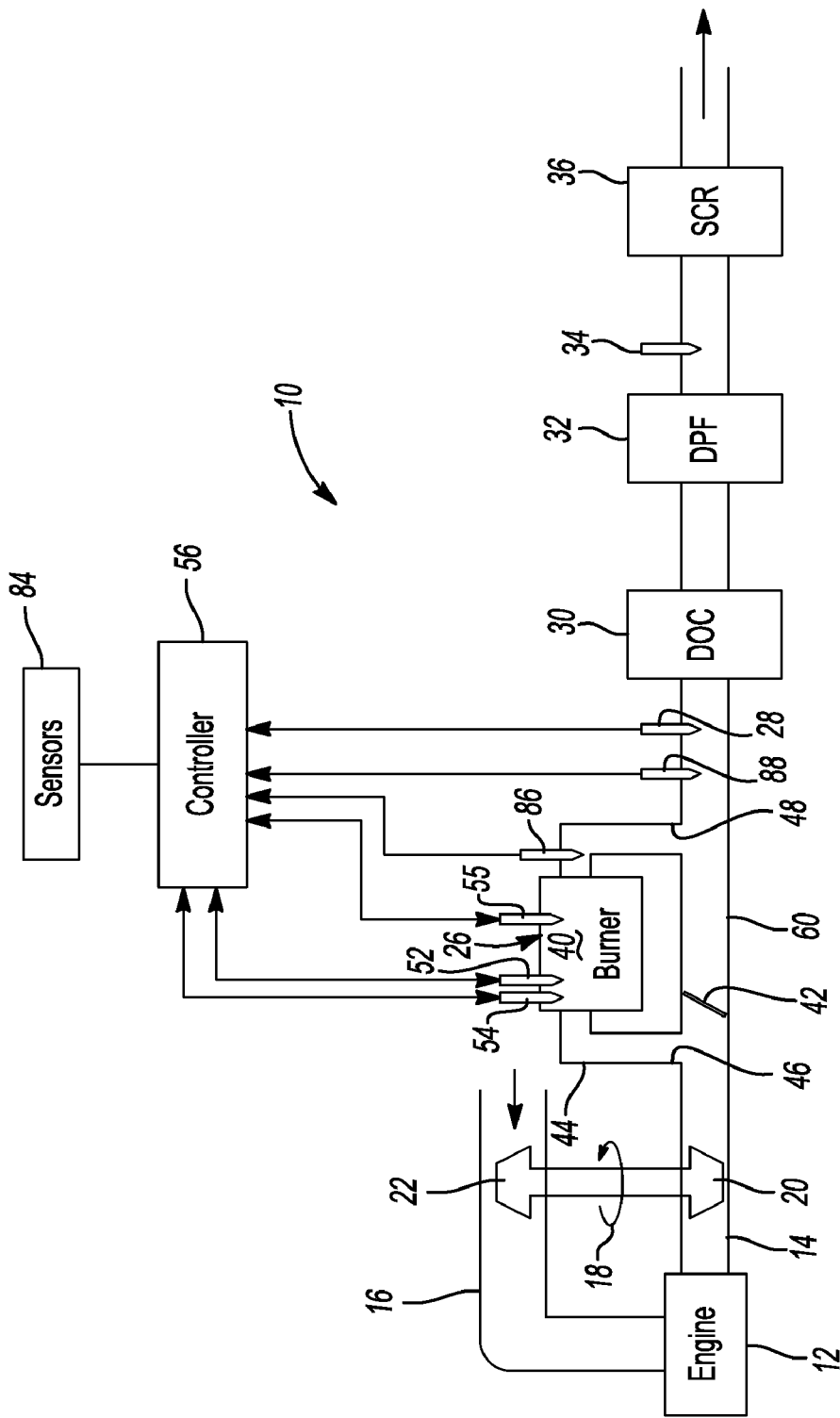
FIG. 1 is a schematic depicting a system for controlling the temperature of an exhaust from an engine.

Example embodiments will now be described more fully with reference to the accompanying drawings.

FIG. 1 depicts a diesel exhaust gas aftertreatment system 10 for treating the exhaust output by engine 12 to a main exhaust passageway 14. An intake passage 16 is coupled to engine 12 to provide combustion air thereto. A turbocharger 18 includes a driven member 20 positioned in an exhaust stream flowing through main exhaust passageway 14 as well as a drive member 22 positioned within intake passage 16 and in communication with intake air. During engine operation, the exhaust stream causes driven member 20 to rotate. Because drive member 22 is fixed for rotation with driven member 20, intake air is compressed within intake passage 16 prior to entry into engine 12.

Exhaust aftertreatment system 10 also includes a valve and burner arrangement 26 positioned downstream from turbocharger 18 and upstream from a number of exhaust aftertreatment devices. In the exemplary aftertreatment system depicted in FIG. 1, the aftertreatment devices include a hydrocarbon injector 28, a diesel oxidation catalyst 30, a diesel particulate filter 32, a urea injector 34 and a selective catalytic reduction system 36.

It is contemplated that engine 12 is configured as a relatively large displacement diesel compression engine having an exhaust mass flow rate ranging from 3000 to 20,000 kg per hour depending on engine operating speed. It should be appreciated that this mass flow rate range is merely exemplary and that the teachings of the present disclosure may be applied to other engines having different exhaust mass flow rates. It is further contemplated that engine 12 typically operates as a lean-burn engine having exhaust temperatures oftentimes less than 300° C. As previously mentioned, proper operation of many of the exhaust aftertreatment devices occurs when the exhaust gas temperature entering the aftertreatment device exceeds 300° C. Accordingly, burner and valve arrangement 26 is provided upstream of the exhaust aftertreatment devices.

Burner and valve arrangement 26 includes a burner 40 and a valve 42 positioned within parallel portions of system 10. In particular, burner 40 is positioned within a bypass passage 44 having an inlet 46 positioned upstream of valve 42 and in communication with main exhaust passageway 14. A bypass outlet 48 is positioned downstream of valve 42 and in communication with main exhaust passageway 14. Bypass outlet 48 is upstream from each of exhaust aftertreatment devices 28, 30, 32, 34 and 36. As such, burner 40 may be used to heat the exhaust to an elevated temperature that will enhance the efficiency of DOC 30 and SCR system 36.

Burner 40 may include one or more injectors 52 for injecting fuel as well as one or more oxygenators 54. One or more igniters 55 function to ignite the injected fuel and oxygen together with unburned fuel already carried in the exhaust. Alternatively, each injector 52 may be a combined injector that injects both fuel and oxygen. A controller 56 is provided to monitor and control the flow of the fuel and/or oxygen through injectors 52, 54 as well as the operation of igniters 55.

Valve 42 is a passive snap-action valve positioned within a tubular portion 60 of main exhaust passageway 14 downstream of bypass inlet 46 and upstream of bypass outlet 48. Valve 42 is depicted in FIGS. 2 and 3 to include a spring anchor 64, a valve spring 66, an external lever arm 68, a valve flap 70, a valve support shaft or axle 72 and an attachment point 74 protruding from axle 72.

Valve flap 70 has first and second arcuate edges substantially conforming to an interior arcuate surface of tube 60. Flap 70 additionally has linear side edges 76 and 78 which provide clearance 80, 82 between flap 70 and an interior surface of tube 60 when the flap is in the closed position shown in FIGS. 2 and 3. Bias element or spring 66 extends between a spring anchor 64 on tube 60 and attachment point 74 of external lever arm 68. Spring 66 biases flap 70 toward the closed positioned shown in FIG. 2. When in the fully closed position, flap 70 resides at an angle other than 90° to a plane extending normal to the longitudinal axis of tube 60. The angle of the flap with respect to a cross-sectional normal plane of tube 60 is designated A.

In operation, exhaust pressure acts on flap 70 from the left as viewed in FIGS. 2-5. When the exhaust pressure is sufficient to overcome the bias force of spring 66, the flap 70 will start to rotate about axle 72. The torque on valve flap 70 is determined by the bias spring force multiplied by a distance d.

Distance d is the distance between the axis of spring 66 and axle 72. The spring force increases as the valve flap opens and spring 66 stretches. However, d gets shorter as the valve continues to open resulting in the torque approaching zero as the longitudinal axis of the spring approaches an "over-center" position. Distance d reduces as the spring axis approaches intersection with a longitudinal axis of axle 72. This nearly over-center positioning of the valve flap 70 as shown in FIGS. 4 and 5 results in a substantially horizontal position of the flap when in the fully open position. This positioning, in turn, minimizes back pressure in the tube when the valve is in the fully open position. Additionally, it is to be noted that the tube itself supplies the stop mechanism for the valve flap in both its fully closed and fully opened positions. In the fully closed position, the arcuate edges of flap 70 contact the interior surface of tube 60 to define that position. Conversely, when in the fully opened position, as shown in FIGS. 4 and 5, flap 70 utilizes its lateral linear side edges (76 and 78 of FIG. 3) to come into contact with the inner surface of tube 60 to thereby provide a stop position for the fully opened position of flap 70.

Rotating the valve flap such that the spring approaches the over-center condition also results in an easier maintenance of the valve in the fully opened position. It should be appreciated that the configuration of valve flap 70 is merely exemplary and that other snap-action valves are contemplated for use within burner and valve arrangement 26. Specifically, U.S. Pat. No. 7,434,570 and U.S. Patent Application Publication Nos. 2008-0223025 and 2008-0245063 are herein incorporated by reference and depict alternate suitable valves.

Controller 56 is also in receipt of signals from various sensors 84 associated with aftertreatment system 10 and engine 12. For example, sensors 84 may include individual sensors for collecting specific data or may broadly refer to data available over a CAN bus. When engine 12 and aftertreatment system 10 are used in a vehicle, the information provided to controller 56 may include battery voltage and ignition switch position data. Additional sensors including a mass air flow sensor, air flow and fuel flow sensors associated with injector 52, a fuel pressure sensor, an air pressure sensor, a burner inlet temperature sensor, a burner outlet temperature sensor and/or an exhaust gas temperature sensor downstream of bypass outlet 48 may also be associated with aftertreatment system 10 and in communication with controller 56.

It should be appreciated that exhaust aftertreatment system 10 may be operated in a number of different modes. In a first mode of operation, controller 56 may be in receipt of a command to operate burner 40 in an active mode. This mode of operation may be entered when the vehicle ignition is on and other sensor data indicates that engine 12 is combusting fuel. During operation of engine 12, controller 56 commands burner 40 to maintain a desired exhaust gas temperature. The control temperature data may be provided by a sensor 86 (FIG. 1) at the burner outlet. Alternatively or additionally, an exhaust gas temperature sensor 88 may be positioned further downstream from the interconnection of bypass outlet 48 and main exhaust passageway 14 to determine the temperature of the mixed exhaust gas entering DOC 30. Controller 56 may operate burner 40 to maintain a desired mixed exhaust temperature as indicated by sensor 88. Burner control continues until controller 56 indicates that engine 12 has ceased operation and/or the ignition switch is in the off position.

It should be noted that valve 42 is passively operated and that the position of flap 70 varies based on exhaust fluid pressure applied to flap 70. The angle of flap 70 at the closed position, the initial preload and rate of spring 66, as well as the position of axle 72 will be determined and defined to assure that the proper flow of exhaust is diverted into bypass passage 44 and burner 40. Controller 56 may selectively actuate injectors 52, 54 and igniters 55 to heat the exhaust gas flowing through bypass outlet 48 to maintain a target temperature.

In another mode of operation, burner 40 may be used to perform active regeneration of DPF 32 after engine 12 has been shut off. In certain operating conditions, engine 12 will cool more rapidly than desired if continued passive regeneration of DPF 32 is desired. Accordingly, controller 56 may activate burner 40 to heat the exhaust gas within main exhaust passageway 14 to regenerate DPF 32 after engine 12 has been shut off. The burner 40 heats the exhaust gas when the exhaust flow has effectively been stopped.

Another mode of operating exhaust aftertreatment system 10 includes monitoring the use of fresh air inputs to engine 12 or exhaust aftertreatment system 10 that are not heated by the combustion process of engine 12. Such systems may include a dynamic brake where relatively cold ambient air may be pumped through engine 12 when combustion does not occur in an attempt to retard the vehicle. The cool air is then provided to DOC 30, DPF 32 and/or SCR system 36. Some of the components within the exhaust aftertreatment devices 30, 32 and 36 may be adversely affected when exposed to a thermal shock such as during dynamic engine braking. Accordingly, it may be desirable to operate burner 40 during engine braking to assure that the exhaust gas entering the aftertreatment devices will be at or above a minimum temperature.

During times when engine 12 operates at a relatively high load and/or operating speed, it is contemplated that valve 42 will be in a substantially open condition and that the temperature of the exhaust within main exhaust passageway 14 will exceed a predetermined minimum temperature for proper operation of exhaust aftertreatment devices 30, 32 and 36. Accordingly, controller 56 will maintain burner 40 at an idle state where fuel is not injected through injector 52 and igniters 55 are not energized. When engine 12 operates at lower loads and lower operating speeds, the exhaust gas temperature will likely decrease. Once controller 56 determines that the exhaust gas temperature upstream from DOC 30 is at or below a predetermined threshold, burner 40 will be operated in its active mode to maintain either a desired burner outlet temperature or a mixed gas temperature upstream from the exhaust aftertreatment devices.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for controlling the temperature of an exhaust from an engine, the system comprising:
   a main exhaust passageway adapted to receive an exhaust stream from the engine;
   a bypass passage having an inlet in communication with the main exhaust passageway and an outlet in communication with the main exhaust passageway at a location downstream from the inlet;
   a burner positioned within the bypass passage for heating the exhaust passing through the bypass passage;
   a valve positioned within the main exhaust passageway downstream from the inlet and upstream from the outlet, the valve being operable to vary the exhaust flow through the burner;
   an exhaust aftertreatment device located downstream of the outlet in receipt of a mixed exhaust supplied from the bypass passage and the main exhaust passageway; and
   a controller determining the operating temperature of the aftertreatment device, the controller determining the temperature of a supply of ambient temperature air that has not been heated by a combustion process, the controller determining a difference between the aftertreatment device operating temperature and the ambient air temperature, the controller initiating fuel injection and ignition within the burner based on the temperature difference exceeding a predetermined value.

2. The system of claim 1 wherein the controller is in receipt of a signal indicative of the ambient air temperature, the controller initiating fuel combustion within the burner based on the signal being below a predetermined temperature.

3. The system of claim 2 wherein the controller is operable to activate the burner when the exhaust stream is not flowing.

4. The system of claim 1 wherein the controller is operable to initiate fuel combustion within the burner in response to the engine operating in an engine braking mode.

5. The system of claim 1 wherein the aftertreatment device is a diesel oxidation catalyst.

6. The system of claim 1 wherein the aftertreatment device is a particulate filter.

7. The system of claim 1 wherein the aftertreatment device is a selective catalytic reduction system.

8. A system for controlling the temperature of an exhaust from an engine, the system comprising:
   an exhaust pipe adapted to receive an exhaust stream from the engine;
   a burner positioned in fluid communication with the exhaust pipe for heating the exhaust passing through the exhaust pipe;
   an exhaust aftertreatment device located downstream of the burner in receipt of exhaust flowing through the exhaust pipe; and
   a controller monitoring a gas temperature within the exhaust pipe at a location upstream of the burner, the controller determining whether an input of fresh air that has not been heated by a combustion process within the engine is being supplied to the exhaust pipe based on the temperature monitoring, the controller initiating injection and ignition of a fuel within the burner based on the fresh air input determination, the controller continuing the supply and ignition of fuel until the temperature of the gas entering the aftertreatment device exceeds a predetermined minimum temperature, wherein the controller determines whether the engine is operating in an engine braking mode and initiates fuel injection and ignition based on the engine braking mode determination.

9. The system of claim 8, wherein the aftertreatment device includes a diesel oxidation catalyst.

10. The system of claim 8, wherein the aftertreatment device includes a particulate filter.

11. The system of claim 8, wherein the aftertreatment device includes a selective catalytic reduction system.

* * * * *